US009130270B1

(12) United States Patent
Nelson et al.

(10) Patent No.: US 9,130,270 B1
(45) Date of Patent: Sep. 8, 2015

(54) SCAN ALIGNMENT SYSTEM

(75) Inventors: Larry Allan Nelson, Seattle, WA (US); Ali Squalli, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 1241 days.

(21) Appl. No.: 12/651,923

(22) Filed: Jan. 4, 2010

(51) Int. Cl.
*H01Q 3/26* (2006.01)

(52) U.S. Cl.
CPC ..................... *H01Q 3/267* (2013.01)

(58) Field of Classification Search
USPC ......................................................... 342/359
IPC ...................................................... H01Q 3/267
See application file for complete search history.

(56) References Cited

U.S. PATENT DOCUMENTS

| | | | |
|---|---|---|---|
| 2,410,831 A | 11/1946 | Maybarduk et al. | |
| 2,720,647 A | 10/1955 | Shepherd et al. | |
| 3,116,418 A | 12/1963 | Fairbanks | |
| 4,176,356 A | 11/1979 | Foster et al. | |
| 4,675,680 A | 6/1987 | Mori | |
| 4,871,948 A | 10/1989 | Nelson | |
| 5,001,490 A | 3/1991 | Fichtner | |
| 5,274,382 A * | 12/1993 | Wills et al. | 342/359 |
| 5,351,060 A * | 9/1994 | Bayne | 342/359 |
| 5,463,402 A | 10/1995 | Walrath et al. | |
| 5,592,176 A | 1/1997 | Vickers et al. | |
| 5,946,603 A | 8/1999 | Ibanez-Meier et al. | |
| 6,590,685 B1 | 7/2003 | Mendenhall et al. | |
| 6,654,590 B2 | 11/2003 | Boros et al. | |
| 6,956,526 B1 * | 10/2005 | Lundstedt et al. | 342/359 |
| 7,250,915 B2 | 7/2007 | Nelson | |
| 7,251,455 B1 | 7/2007 | Mower et al. | |
| 7,330,151 B1 | 2/2008 | Monk et al. | |
| 7,528,773 B2 | 5/2009 | Fall et al. | |
| 8,094,073 B2 | 1/2012 | Nelson et al. | |
| 8,224,241 B1 * | 7/2012 | Gunasekara et al. | 455/25 |
| 8,279,117 B2 | 10/2012 | Nelson | |
| 2003/0048222 A1 * | 3/2003 | Schmid et al. | 342/359 |
| 2008/0139124 A1 | 6/2008 | Tillotson | |
| 2009/0073064 A1 * | 3/2009 | Russo et al. | 343/757 |
| 2010/0123625 A1 * | 5/2010 | Martin et al. | 342/377 |
| 2010/0127930 A1 | 5/2010 | Nelson | |
| 2010/0207818 A1 * | 8/2010 | Nelson et al. | 342/369 |

FOREIGN PATENT DOCUMENTS

| | | |
|---|---|---|
| EP | 351934 | 1/1990 |
| JP | 2006-270806 | 10/2006 |

OTHER PUBLICATIONS

Gabor, D., "Theory of Communication," *J. Inst. Electr. Eng.*, vol. 93, pp. 429-457, 1946, Inst. Electr. Eng., London, U.K.

* cited by examiner

*Primary Examiner* — Tashiana Adams
*Assistant Examiner* — Fred H Mull
(74) *Attorney, Agent, or Firm* — Todd Stuart

(57) ABSTRACT

A scan alignment system and method for calibrating a scan path for a directional antenna system is presented. The scan alignment system calibrates the scan path by generating a scan path, scanning the directional antenna through the scan path, receiving a signal signature responsive to the scanning, comparing the signal signature with a reference signature, and determining a corrective calibration to apply to the scan path that minimizes the difference between the signal signature and the reference signature. In an embodiment, the reference signature is modeled based on the directional antenna and the intended scan path.

18 Claims, 16 Drawing Sheets

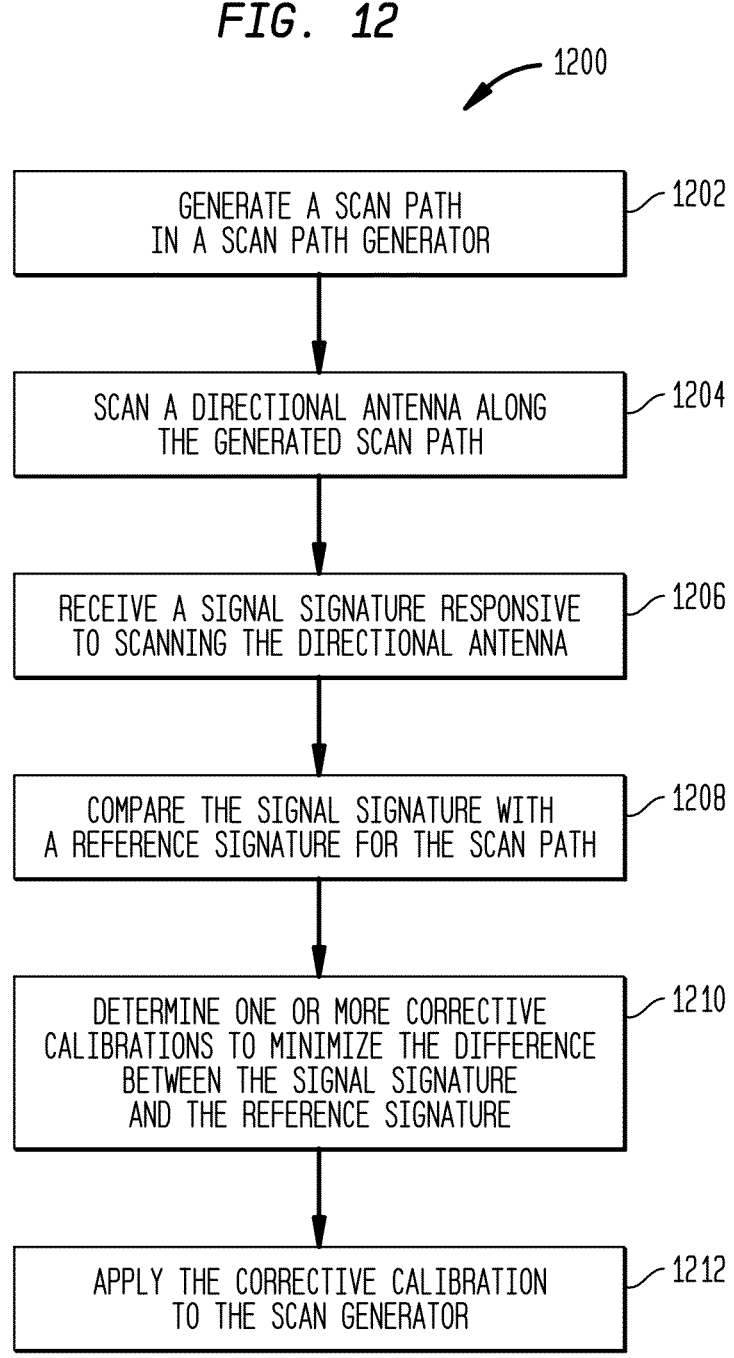

SCAN ALIGNMENT SYSTEM

CROSS-REFERENCE TO RELATED APPLICATIONS

The present application is related to U.S. patent application Ser. No. 12/277,192 filed Nov. 24, 2008, entitled "Burst Optimized Tracking Algorithm", and U.S. patent application Ser. No. 12/371,866 filed Feb. 16, 2009, entitled "Robust VSAT Tracking Algorithm", the disclosures of which are incorporated herein by reference in their entirety.

FIELD

Embodiments of the subject matter described herein relate generally to a system and method for achieving scan path accuracy by applying corrective calibrations to scans of directionally agile antennas.

BACKGROUND

Communications systems that utilize non-stationary users or relay sites frequently use directional antennas to direct radio signals between stations. Communications systems are designed to be as efficient as possible, both in terms of spectral efficiency and power efficiency. Moving stations require tracking systems to assist in pointing radio signal beams. Tracking systems ensure that beams widths can be kept as narrow as possible. Narrow beam widths reduce the amount of power necessary for effective communication between stations, prevent unwanted parties from potentially receiving signals, and prevent overlap of signals onto spatially adjacent receivers, which is important to minimize interference and for regulatory compliance.

Directional antennas require a high degree of pointing accuracy to maintain adequate power in the communication link and to minimize interference with neighboring receptors. Tracking systems maintain this pointing accuracy by correcting for errors such as inertial reference drift or target movement. Tracking systems work by inscribing modulation on a signal received from the tracked signal source, for example a satellite. The modulation is dependent on the motion, or scan path, of the directional antenna. The attendant modulation is used to deduce relative pointing position. Prior art tracking systems generally require highly directional antennas and several degrees of separation between satellites to ensure tracking signals only arise from the desired source. In practice however, antennas are often small aperture antennas and station separation is minimal, creating the possibility of impairment to the tracking signal from those nearby stations. These impairments change the nature of the tracking signal, corrupting the tracking signal and degrading the accuracy of the tracking capability. The resulting mis-pointing reduces the effective data capacity of data links between stations.

Several systems and methods were developed to improve the tracking algorithms of directional communications systems and correct for impairments to tracking signals by adjacent satellites. U.S. patent application Ser. No. 12/277,192 filed Nov. 24, 2008, entitled "Burst Optimized Tracking Algorithm" includes a system and method for optimizing tracking algorithms of directional communications systems for enhancing data communications between sending and receiving parties. U.S. patent application Ser. No. 12/371,866 filed Feb. 16, 2009, entitled "Robust VSAT Tracking Algorithm" includes a system and method to reduce the effect of signal impairments from interfering sources by measuring the mathematical morphologic features of the detected tracking signal and using those features to normalize the pointing of the antenna against interference induced pointing error. Improvements to the accuracy of the scan path actually traversed will improve the function of the above tracking methods.

Small aperture antennas are often used on mobile platforms like aircraft, because of size and weight considerations. Small aperture antennas can be directionally agile antennas capable of being steered towards a tracked satellite. Phased array antennas are one kind of directionally agile antenna. Because phased array antennas are steered electronically, it is difficult to accurately detect deviations in the actual scan path taken in relation to the intended scan path. When the scanning is performed without any feedback, it is described as an open loop system. Some small aperture antennas use inertial pointing based on inertial reference units instead of tracking systems to point at the desired satellite and to stabilize the antenna orientation. But inertial reference units are susceptible to drift over time and operate as an open loop system without feedback for pointing accuracy. Because of this lack of feedback, mechanical movement accuracy of antennas degrades due to mechanical wear and perturbation from external sources, such as vibration, misbalancing, residual torques, or bearing friction.

Accurate scan paths improve feature accuracy for received signal patterns.

SUMMARY

Presented is a system and method for improving the ability of scanning systems for directional antenna based communications systems to maintain a prescribed scan path. Maintaining a prescribed scan path results in a more accurate feature development from the inscribed modulation and therefore more accurate direction determination. More accurate tracking improves the robustness of the communications system and results in data links with higher average throughput and subsequently lower cost per bit of data transferred across the data links. More accurate tracking results in better data link power margins and promotes spectral efficiency by increased frequency reuse. More accurate beam directionality improves security.

In various embodiments, the system and method improves the scanning accuracy by modeling or characterizing the effect of deviations in the actual scan path from the intended scan path, calibrating the scan path by adding alignment features to the basic scan path, and dynamically controlling the accuracy of the scan path by monitoring the power spectral density of the received signal strength indication signal (RSSI signal) and dynamically adjusting the alignment features added to the basic scan path in response to the detection of previously characterized deviations.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the scan alignment system and method. A brief description of each figure is provided below. Elements with the same reference number in each figure indicate identical or functionally similar elements. Additionally, the left-most digit(s) of a reference number indicates the drawing in which the reference number first appears.

FIG. 12 is a flowchart of a scan alignment process in one embodiment of the scan alignment system and method;

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Figure 1:
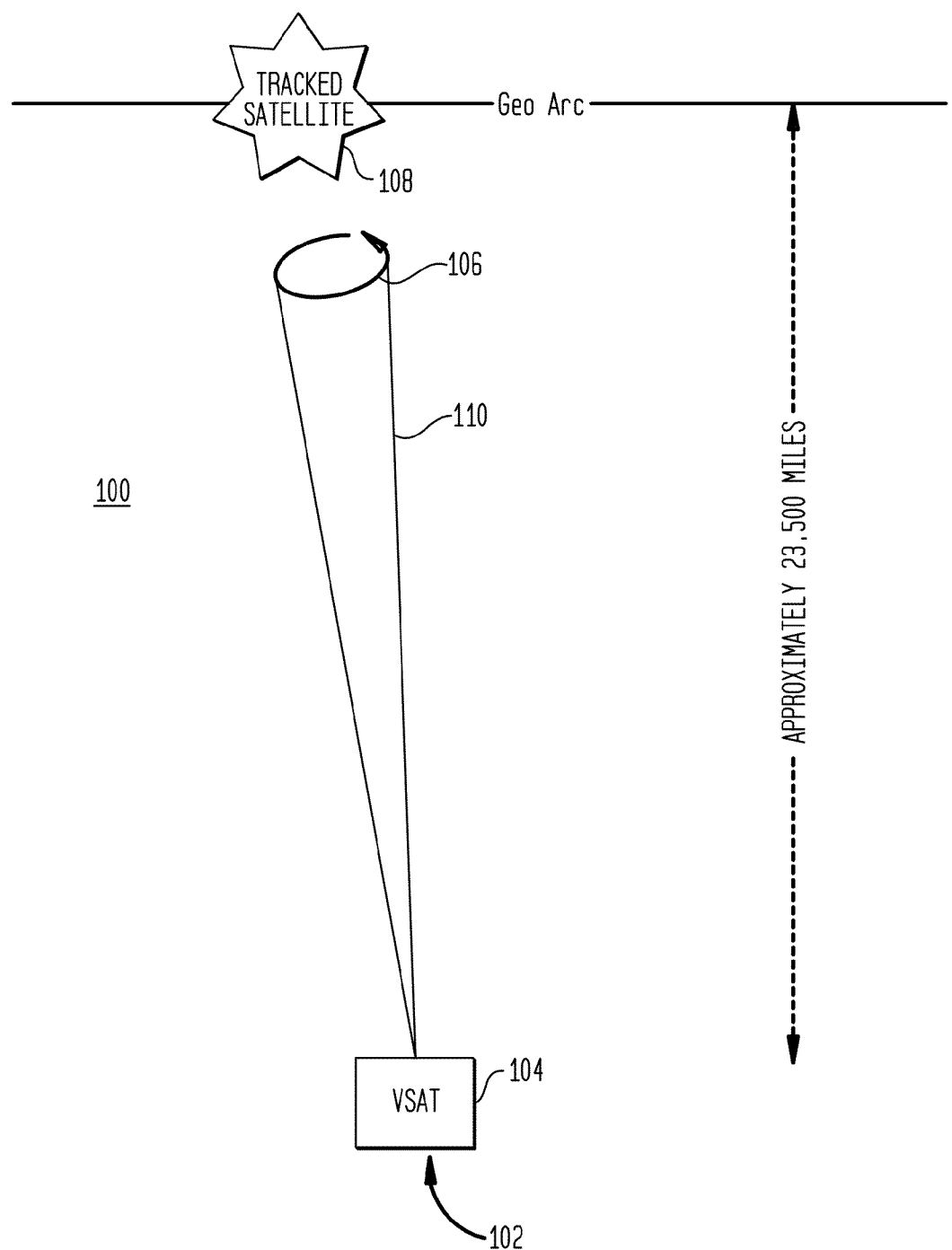
FIG. 1 is a diagram of a communications network including a mobile network element having a very small aperture antenna and a tracked satellite in one embodiment of the scan alignment system and method.

Referring now to FIG. 1, a graphical representation of a communications network 100 is shown, not to scale. A mobile network element 102 communicates with tracked satellite 108 using an antenna 104, for example a very small aperture antenna or VSAT. The antenna 104 in mobile network element 102 is steered towards tracked satellite 108. Phased array antennas are one kind of directionally agile antenna that can be steered towards a tracked satellite 108. The term satellite 108 is used throughout this disclosure for ease of exposition, however the system and method is applicable to tracking any source of electromagnetic radiation. Therefore, although the term satellite 108 is used, it should be interpreted as any generic source of electromagnetic radiation, whether actively emitting or passively reflecting, including but not limited to celestial objects radiating or reflecting radiation, satellite or spacecraft communications platforms, airborne communications platforms, mobile communications platforms, land-based communications platforms, electromagnetic radiation emitters, passive reflectors or retro-reflectors of electromagnetic radiation, or even localized areas that are devoid of electromagnetic radiation as measured against a background of radiation.

A mobile network element's 102 directional antenna 104 is pointed approximately towards the tracked satellite 108. The tracking signal error for an antenna 104 is determined by introducing an approximately circular scanning motion, or scan 110, at a small angle around the expected center of the signal beam from the tracked satellite 108, sometimes more easily described and shown as a scan path 106. The scan 110 by the antenna 104 modulates the tracking signal, which, in a closed loop tracking solution, is processed to produce a tracking error signal. The tracking error signal is used to correct the pointing of mobile network element's 102 antenna 104. Although the figures, examples, and description disclosed hereafter reference both antennas 104 and VSATs, the system and methods disclosed are applicable to VSATs, phased array antennas, and any other directional antennas, as well as directional beam scanning systems for any frequency of electromagnetic radiation including, but not limited to, radio wave, x-ray, infrared, UV, or light.

Some antennas 104 have asymmetries in the scan 110 causing extra modulation of the otherwise sinusoidal tracking error signal. This extra modulation of the tracking error signal causes a less spectrally compact tracking error signal compared to a generally sinusoidal tracking error signal. This lack of spectral compactness increases the required filter bandwidth in the tracking system, decreases the signal-to-noise ratio and degrades tracking accuracy. An equal amplitude scan adjusts the scan to the particularities of antenna 104 such that the scan 110 of the beam around the expected center of the signal beam from the tracked satellite 108 is as spectrally compact as practicable.

The tracking signal has amplitude dependent upon beam shape and the beam scan path 106. An equal amplitude scan 110 adjusts the scan path 106 in light of the beam shape. An explanation of the method is presented in one dimension, x, however the method is applicable to multiple tracking dimensions. A commonly used uncertainty metric, often attributed to Gabor [Gabor, D., "Theory of Communication", J. Inst. Electr. Eng., Vol. 93, 1946] and incorporated herein, is the product of two effective widths, $$U = (\Delta x)(\Delta \omega)$$

where these widths are the normalized variance of the energy density in the spatial and spatial frequency domains.

$$(\Delta x)^2 = \frac{\int (x - x_0)^2 |g(x)|^2 dx}{\int |g(x)|^2 dx}$$

$$(\Delta \omega)^2 = \frac{\int (\omega - \omega_0)^2 |G(\omega)|^2 d\omega}{\int |G(\omega)|^2 d\omega}$$

This product has a lower bound, or uncertainty, $$U \geq 0.5$$

and Gabor showed that the complex function, $$g(x) = e^{j(\omega x + \theta)} e^{-\left(\frac{x^2}{2\sigma^2}\right)}$$

achieves the lower bound. Note that this is a product of a periodic scan having a spectrally compact nature times a Gaussian apodization function. Note that $\Delta x$ and $\Delta w$ are normalized energy density, therefore $$g(x) = K e^{j(\omega x + \theta)} e^{-\frac{x^2}{2\sigma^2}}$$

where K is a constant, also achieves the lower bound. If K is not constant, then its modulation K(x) will alter G(ω) and the uncertainty product U will increase. The amount of increase associated with a scan design can be calculated and minimized by changing the modulation and the basic scan path. For any given beam shape and scan path 106, the figure of merit for spectral compactness can be calculated:

$$U = \min[(\Delta x)(\Delta \omega)]$$

where U is calculated over the entire scan path and the scan path is closed.

In an embodiment, the beam shape is traversed as near as possible to equal amplitude since a constant amplitude is normalized to have no affect on reaching the minimum U. Any amplitude modulation of the beam will create beam spreading in the frequency domain. That is, if an equal amplitude profile is traced on the beam, no modulation occurs at the scan frequency even though the tracking signal is created. Further, for small tracking errors, a small amount of energy K(x) is created at the scanning frequency so the modulation of K(x) does not increase the uncertainty product significantly. Alternative scan designs that are not on equal amplitude paths may create larger amounts of energy and raise U. For example scan paths 106 such as Gabor-inspired scan paths, Slepian scan paths, or wavelet scan paths are alternative scan path 106 design choices to equal amplitude scan paths 106 that can be used to produce tracking signals suitable for the signal processing requirements. For Slepian scan paths in general, see "Prolate Spheroidal Wave Functions, Fourier Analysis and Uncertainty", D. Slepian and H. O. Pollak, Bell System Tech. J, 1961. The term equal amplitude is used herein to designate a scan path 106 wherein an effort is made in the scan pattern design to minimize U and therefore achieve a spectrally compact result. For some beam shapes, a scan path 106 that is equal amplitude may be very difficult, leading to a compromised scan pattern design. The amount of the compromise can be minimized as suggested by careful selection of the scan path 106 in light of the beam characteristics. A scan path 106 that is equal amplitude is optimized to present an improved accuracy spatial and polarization characterization in less spectral space for the particular antenna 104 beam shape. The scan alignment system can be used to ensure that the scan path chosen for the particular antenna 104 will produce a tracking signal suitable for the signal processing plan of the tracking system. Scan paths 106 that are equal amplitude improve the closed loop tracking solution for tracking the tracked satellite 108.

The closed loop tracking solution for tracking the tracked satellite 108 is only closed loop as to azimuth and elevation positioning accuracy if the tracking signal is used as feedback in the control mechanism. The actual pointing of the antenna 104 along the scan path 106 can be an open loop system when there is no feedback as to the relative instantaneous position of the antenna 104 during the scan 110 even if the scan path 106 is a closed scan path. If the scan path 106 is operated open loop using knowledge of the basic parameters of the antenna control system, for example the electrical characteristics and parameters of a electronically steerable phased array antenna, or the mechanical properties of a dish that is wobbled periodically about one or more axes, then the result is an uncalibrated scan 110 that only approximates the intended scan path 106. Even when tracking is incorporated, the errors are generally decreased but not eliminated. An inaccurate scan path 106 may result in a tracking system that is not able to operate robustly or to effectively normalize the tracking output to interference from adjacent satellites. Uncalibrated scan paths may cause the received signal to degrade from its intended properties, leading to loss of accuracy in computing features and/or loss of signal to noise in the tracking system.

For antennas 104, the scan paths 106 are perturbed by mechanical imperfections including but not limited to friction, mechanical wear, residual torque from cables connected to the moveable portion of the antenna 104, inertia, vibration, and imperfections in the drive system itself such as limits in addressability (the number of points to define the scan 110) and quantization (resolution of the address of each of the points that define the scan 110) in the drive path control system. These imperfections have different effects depending upon the particular operation of the antenna 104, for example, if the scan frequency is changed or the mounting of the antenna 104 is changed. For example, mounting the antenna 104 on a pole above a vessel or placing the antenna 104 in the tail section of an aircraft, instead of the fuselage, would alter the amount of vibration. For directionally agile antennas 104, such as phased array antennas, it is difficult to accurately detect deviations in the actual scan path 106 of the scan in relation to the intended scan path 106, because the pointing is performed electronically and is therefore not visibly apparent.

Further, the scan path 106 of the scan 110 may not be circular or simple, and therefore the effect of scan 110 imperfections may be difficult to predict. For example, the scan path 106 can be a Gabor scan where the scan path 106 is closed but altered dynamically during a sequence of sequential scans 110 before returning to the initial starting position. The solution is to verify that the scan path 106, or sequence of scan patterns, for the particular antenna 104 meets the tracking signal requirements of the signal processing plan for the tracking control system.

In an antenna control system, the tracking requirements for functionality arise for each system element as part of the overall system design, including a signal processing plan that preserves feature accuracy. Because it is the actual scan 110 that shapes the received signal, characterizing the scan 110 provides a method of verifying that the scan path 106 in combination with the particular antenna 104 meet the overall system design requirements. This verification is based upon a very sensitive measure of patterning created by the scan path. That measure is based upon Plancheral's Theorem:

$$\int_{-\infty}^{+\infty} |f(x)|^2 \, dx = \int_{-\infty}^{+\infty} |F(s)|^2 \, ds$$

Plancherel's theorem has the interpretation in the sciences that the Fourier transform preserves the energy of the original quantity. Therefore, the interference that is evident in the signature spectrum occurs according to the relative interference energy that falls within the passband used for feature measurement. The measurements all are predicated upon the scan path 106, or scan pattern, and beam shape. The patterns of energy distribution that are defined by the scan path 106, or scan pattern, and beam shape are measured with great sensitivity in the frequency domain, as described in examples below.

Figure 2:
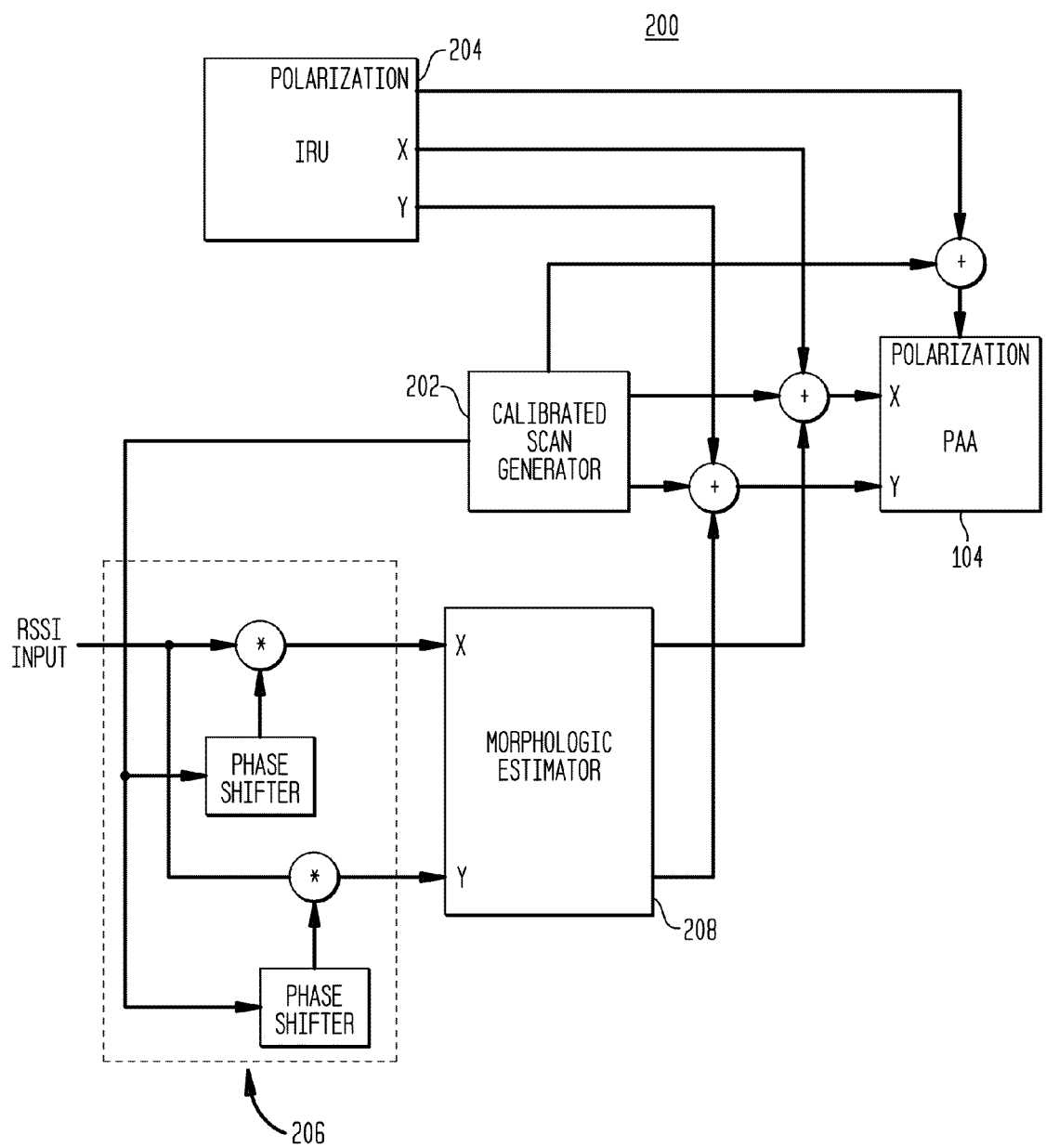
FIG. 2 is an diagram of a tracking system with a calibrated scan generator in one embodiment of the scan alignment system and method.

Referring now to FIG. 2, an embodiment of the scan alignment system is a tracking system with calibrated scan generator 200, comprising a calibrated scan generator 202, an Inertial Reference Unit (IRU) 204, a coherent detector 206, and a morphologic estimator 208 and provides the x and y pointing angles and polarization to the antenna 104. IRU 204 directs the mobile network element's 102 directional antenna 104, for example a Phased Array Antenna (PAA), approximately towards the tracked satellite 108 and inertially stabilizes the pointing attitude of the antenna 104. In one embodiment, the IRU 204 provides heading, pitch, roll, and position information to generate approximate x and y pointing angles and polarization for the antenna 104. The calibrated scan generator 202 performs a scan 110 in the direction of the tracked satellite 108. The calibrated scan generator 202 contains alignment features which add to the basic scan 110 to control symmetry, ellipticity, irregularity, circularity, tilt, offset, polarization, quantization, and other large scale irregularities. Large scale irregularities affect more than one scan 110 sample and in general are bandlimited consistent with the reconstruction of the scan 100 in the tracking system. In one embodiment of the tracking system with calibrated scan generator 200, large scale alignment capabilities that correct large scale irregularities or portions of irregularities are smooth functions that can be superposed with the basic scan to pre-distort the scan 110 to effect alignment of the scan path 106 to a design requirement.

Smooth functions are bandlimited and do not alias significantly in the sampling and reconstruction when used to perform the large scale alignments used in the tracking system with calibrated scan generator 200. In one embodiment, the smooth functions are created from a set of basis functions determined from modeling scan paths 106 to correct for known types of perturbations to the scan paths 106. In another embodiment, the smooth functions are developed by the tracking system with calibrated scan generator 200 using learning algorithms such as neural networks, fisher-linear trees, Bayesian weighted formulas, fuzzy logic, or other artificial intelligence means as would be understood in the art. An example of smooth functions in a sampled data correction environments, but for a different application, is their use for digital convergence as disclosed in U.S. Pat. No. 4,871,948, "Memory Mapped Deflection Correction System", wherein it is stated, "The invention overcomes this [under-sampling] problem by determining the proper sampling requirements for accurate waveform reconstruction." Waveforms that meet such proper sampling requirements are smooth functions.

Continuing to refer to FIG. 2, a coherent detector 206 operating at the same frequency as the calibrated scan generator 202 receives a signal during the scan 110 from the tracked satellite 108 to produce a received signal strength indication (RSSI) image. The morphologic estimator 208 outputs tracking offsets for position tracking control. In an embodiment, the morphological estimator 208 outputs tracking offsets for polarization tracking control (not shown.) Example features used for tracking comprise centroid, compactness, skewness, and kurtosis and as further described in U.S. patent application Ser. No. 12/371,866 filed Feb. 16, 2009, entitled "Robust VSAT Tracking Algorithm." Because these features are influenced by the scan path 106, the feature accuracy can be improved using the corrections incorporated in the calibrated scan generator 202.

Figure 3A:
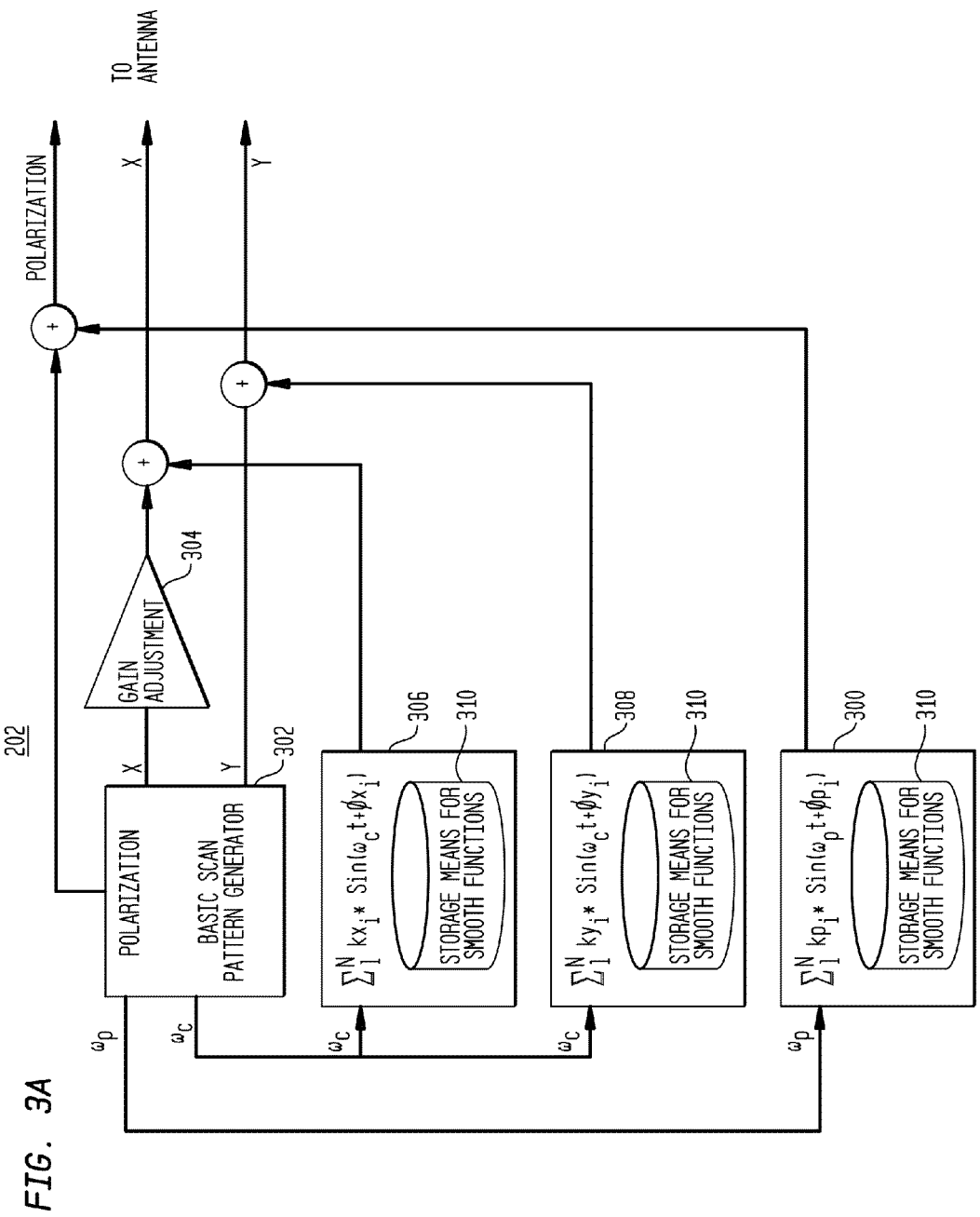
FIG. 3a is a diagram of a scan generator with alignment capabilities in one embodiment of the scan alignment system and method.

Referring now to FIG. 3a, an embodiment of the scan alignment system comprises a calibrated scan generator 202. The calibrated scan generator 202 comprises a basic scan pattern generator 302 for producing a scan 110 at the scan frequency $\omega_C$, a gain adjustment amplifier 304 for controlling symmetry and ellipticity of the scan path 106, a first smooth function offset alignment generator 306 and a second smooth function offset alignment generator 308 for aligning the scan path 106, and a third smooth function offset alignment generator 300 for aligning polarization. The calibrated scan generator 202 adjusts the scan pattern of the scan 110 by altering the 2*N constants $k_{xi}, \Phi_{xi}, k_{yi}, \Phi_{yi}, k_{pi}, \Phi_{pi}$ to adjust the scan path 106, or scan pattern, and the polarization of the antenna 104 to meet tracking requirements. In an embodiment, polarization is adjusted at a lower rate, $\omega_P$, for example once per scan 110. These constants may themselves be adjusted in patterns thereby giving rise to smooth function corrections to improve convenience of adjustment.

For example, if the scan 110 is apodized (using a window function on the scan path 106), the same apodization can overlay the adjustments $k_{xi}, \Phi_{xi}, k_{yi}, \Phi_{yi}$ and then they can be differentially adjusted. In another example, the basic symmetry of the scan 110 can be adjusted by grouped adjustment of constants. These alignments are made based upon characterization of the effects on the scan path 106 of the scan 110. The alignment is accomplished using smooth functions that are input to the first smooth function offset alignment generator 306, and second smooth function offset alignment generator 308. It is the alignment of the patterns of the scan 110 sample values that gives rise to the sensitivity and precision of the scan path 106 control.

The smooth function offset alignment generators 306, 308, 300 provide a means for adjusting the scan path 106 to achieve the design objectives while preserving the spectral compactness of the tracking signal in accordance with the filters used in the signal processing plan. A spectrally compact signal allows the use of narrow filters that allow the tracking signals to pass through the filters with minimal alteration while blocking noise and other energy in the received signal that is unrelated to the tracking signal. Narrow filters help to increase the signal-to-noise ratio of the tracking result, increasing the robustness of the tracking system. The smooth function offset alignment generators 306, 308, 300 in combination with the gain adjustment amplifier 304 present a means for assuring scan path 106 accuracy. The smooth functions can be stored as sampled data or by storing constants from which they can be generated from different basis functions in a storage means 310, for example electronic memory such as flash memory.

Figure 3B:
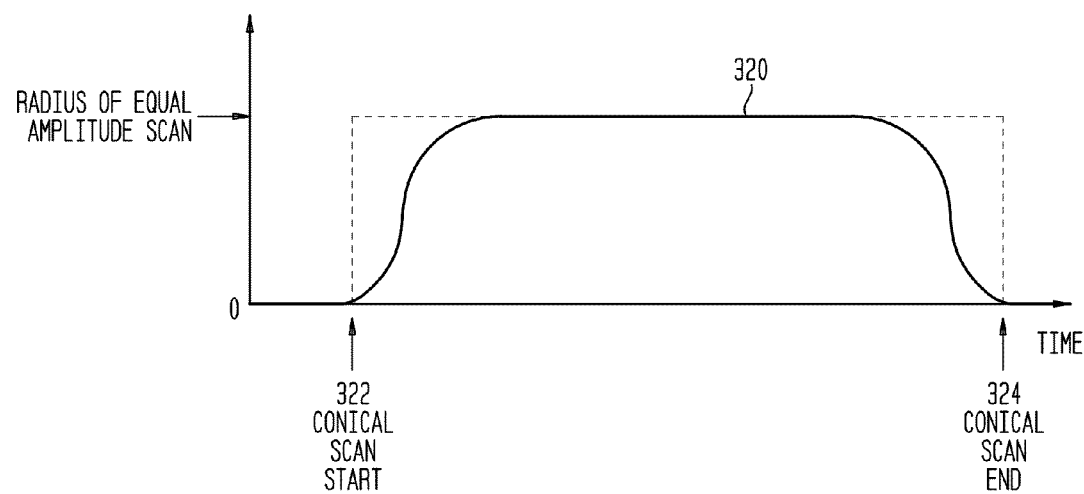
FIG. 3b is a diagram of an apodized scan function in one embodiment of the scan alignment system and method.
Figure 3C:
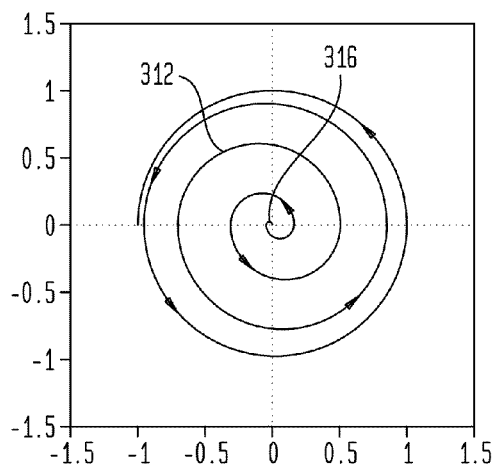
FIGS. 3c, 3d, 3e, and 3f are diagrams of scan paths that are apodized as shown in FIG. 3b in one embodiment of the scan alignment system and method.
Figure 3D:
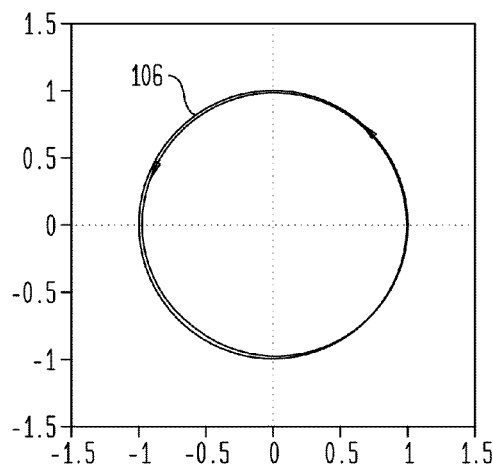
Figure 3E:
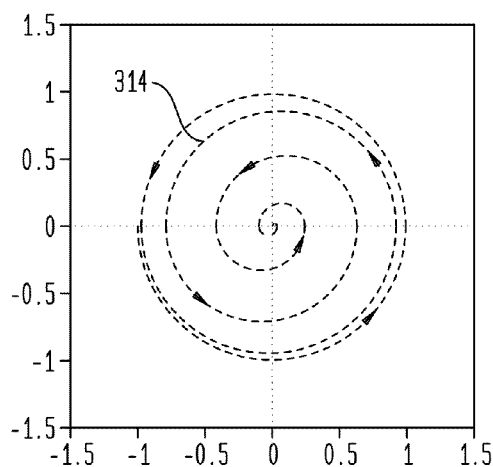
Figure 3F:
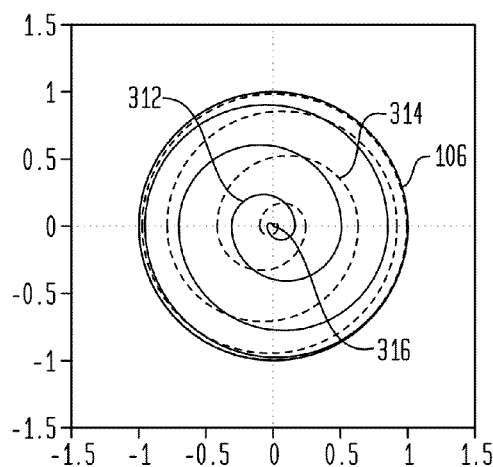

The smooth function offset alignment generators 306, 308, 300 also ensure that window functions applied to the scan path 106 will also work with the rest of the signal processing plan. Referring now to FIG. 3b, a simplified apodized scan function 320 is shown for one dimension, showing a beginning 322 of the scan 110 and the end 324 of the scan 110. In various embodiments, the window functions used for apodization include functions well known in the art; for example: Bartlett, Bartlett-Hanning, Blackman, Blackman-Harris, Bohman, Chebyshev, Flat Top, Gaussian, Hamming, Hann, Kaiser, Nuttall, Parzen, Rectangular, Triangular, and Tukey window functions. Referring now to FIGS. 3c, 3d, 3e and 3f, the scan path 106 is apodized, beginning with a spiral scan path 312 that starts from an initial position 316, grows to a steady state scan path 106, and ends with a collapsing spiral scan path 314 back to the initial position 316. FIGS. 3c, 3d, and 3e illustrate the spiral scan path 312, the steady state scan path 106, and the collapsing spiral scan path 314, respectively, while FIG. 3f illustrates a composite of FIGS. 3c, 3d, and 3e. Using a window function to apodize a scan path 106 allows a designer to start and stop a scan 110 while creating a tracking signal that is free of unwanted spectral energy, as would occur if the scan 110 were instantaneously started and stopped. In this example embodiment, the scan path 106 that is apodized approximates a scan path 106 that is Gabor-inspired, but is not Gabor because of the constant radius central to the scan path 106.

The scan alignment system provides a means for modeling scans 110. For a scan 110 that is actually performed using an actual antenna in the natural environment, the scan alignment system further provide a means for determining that spatial quantization for the scan 110 is sufficient to produce feature accuracy, a means for aligning frequency of the scan 110 in accordance with the signal processing plan, a means for designing the scan 110, and a means for detecting the resistance of the scan 110 to AGC variation in accordance with the signal processing plan. Further, the scan alignment system provides a means for discovering and characterizing scan-induced artifacts created by pointing errors during the scan 110, calibrating the scan path 106 in order to align the scan 110 to the scan 110 that was intended, and verifying the elimination of artifacts after calibration.

To characterize the scan path 106, the antenna 104 is steered in a closed path, for example a scan path 106 that is equal amplitude and repeats while receiving a distant signal from a source such as the tracked satellite 108. The amplitude of the received signal depends principally on the scan path 106 actually traversed and the directional qualities of the antenna 104. Any particular scan path 106 has a "signature spectrum" that is determined in advance by modeling. Alignment consists of achieving the signature spectrum by adjustment of the constants of the first smooth function offset alignment generator 306, second smooth function offset alignment generator 308, and the gain adjustment 304. In an embodiment, the polarization is also aligned using the third smooth function offset alignment generator 300 for polarization alignment. In an embodiment, the alignment adjustments are performed consistent with the smooth function requirement for a sufficient sampling basis in the scan quantization.

FIGS. 4a through 11c illustrate several basic perturbances and several signal signatures associated with the basic perturbances. These are intended to help understand the training process for the scan alignment system and are not intended to limit the scan alignment system to these basic perturbances.

Figure 4A:
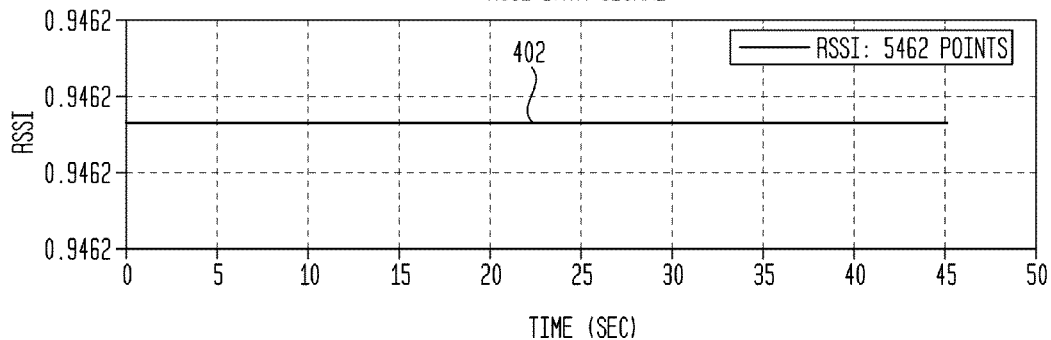
FIG. 4a is a graph of the received signal strength indication for an on bore site equal amplitude scan in one embodiment of the scan alignment system and method.
Figure 4B:
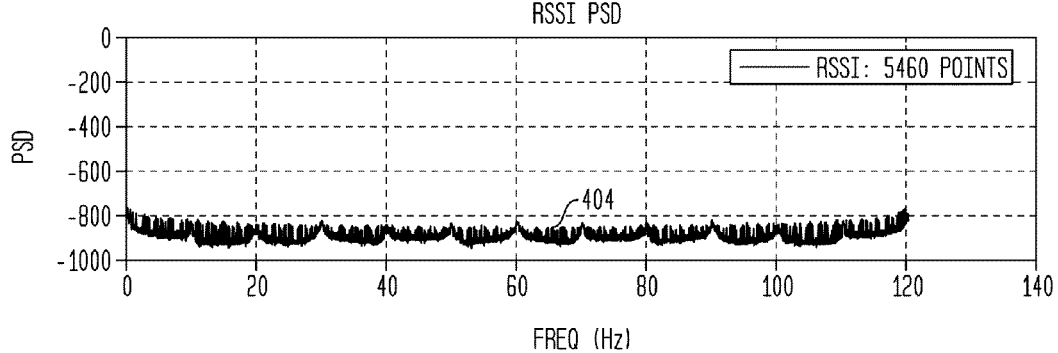
FIGS. 4b and 4c are graphs of the power spectral density for an on bore site equal amplitude scan in one embodiment of the scan alignment system and method.
Figure 4C:
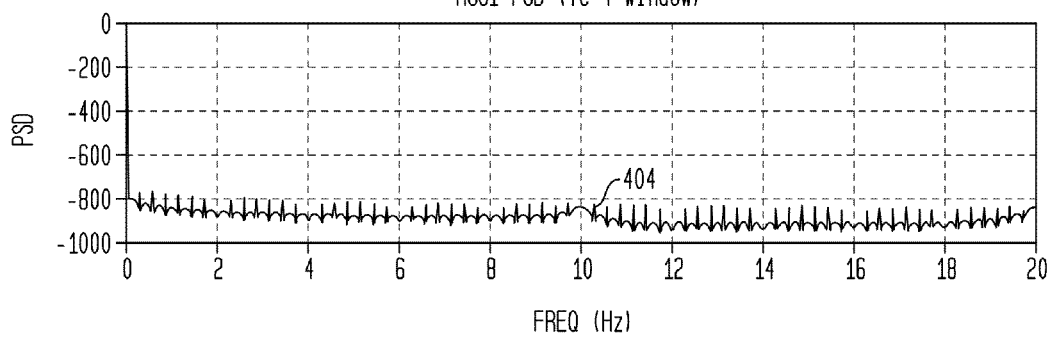

Referring now to FIGS. 4a, 4b, and 4c, the signature spectrum is shown for a antenna 104 having a 2 degree main lobe (at −3 dB) and a directional response $$RSSI = 10^{-0.15\theta^2}$$

when scanned in a 0.4 degree circle around the bore site of the signal source, for example the tracked satellite 108. FIG. 4a shows a modeled Received Signal Strength Indication signal, or RSSI signal 402. The RSSI signal 402 is equal amplitude because the scan 110 is a perfect circle and it occurs around the bore sight of the signal source. The Power Spectral Density, or PSD 404, of the RSSI signal 402 is shown in FIG. 4b. The perfect scan 110 has only energy at 0 frequency. The low frequency terms are expanded in FIG. 4c. The vertical scale in this figure is in dB (i.e. a log scale). This is an extremely sensitive measure of the circularity of the scan 110 since any deviation from circularity will result in spectrum at multiples of the scan frequency.

Figure 5A:
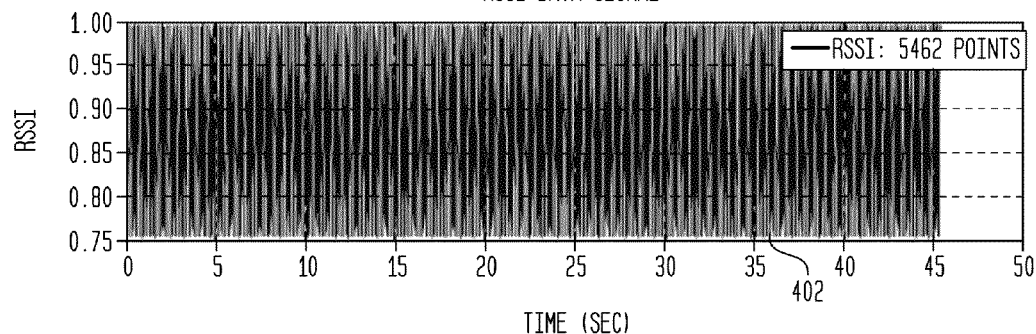
FIG. 5a is a graph of the received signal strength indication for an off bore site equal amplitude scan in one embodiment of the scan alignment system and method.
Figure 5B:
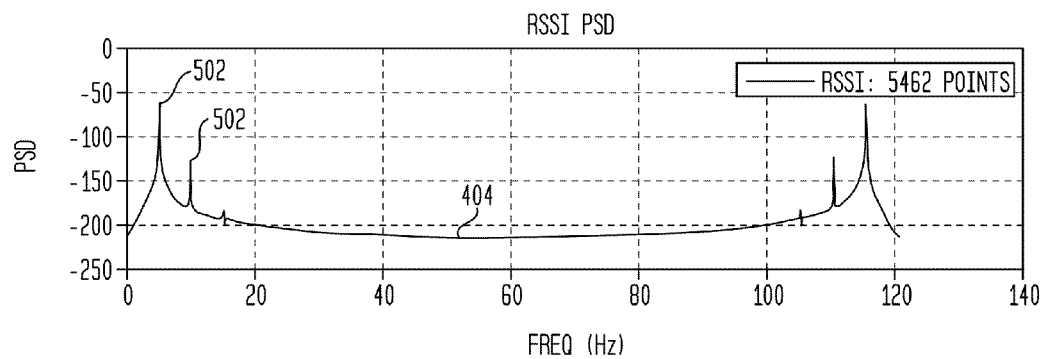
FIGS. 5b and 5c are graphs of the power spectral density for an off bore site equal amplitude scan in one embodiment of the scan alignment system and method.
Figure 5C:
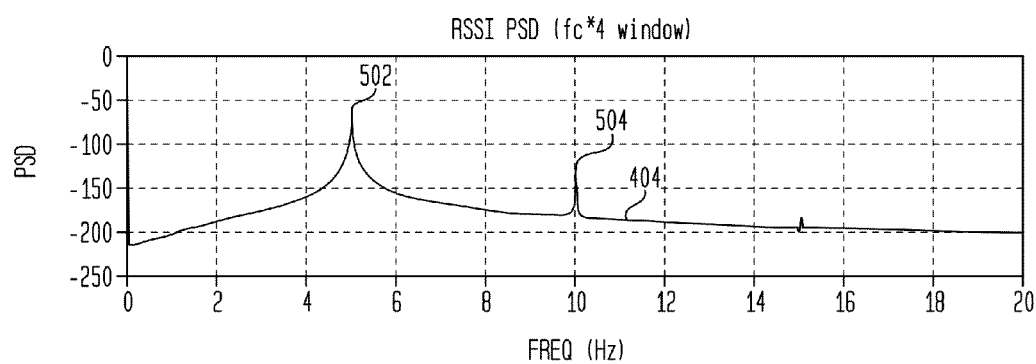

FIGS. 5a, 5b, and 5c show the spectral effects of scanning off bore sight. An off bore site scan 110 causes an increase in energy at multiples of the scanning frequency 502. This is illustrated in the PSD 404 of the RSSI signal 402. FIGS. 5b and 5c illustrate that when the satellite is off bore sight, the energy occurs principally at the scanning frequency 502 and at two times the scanning frequency 504. This condition distinguishes tracking error from scan path 106 errors.

Figure 6A:
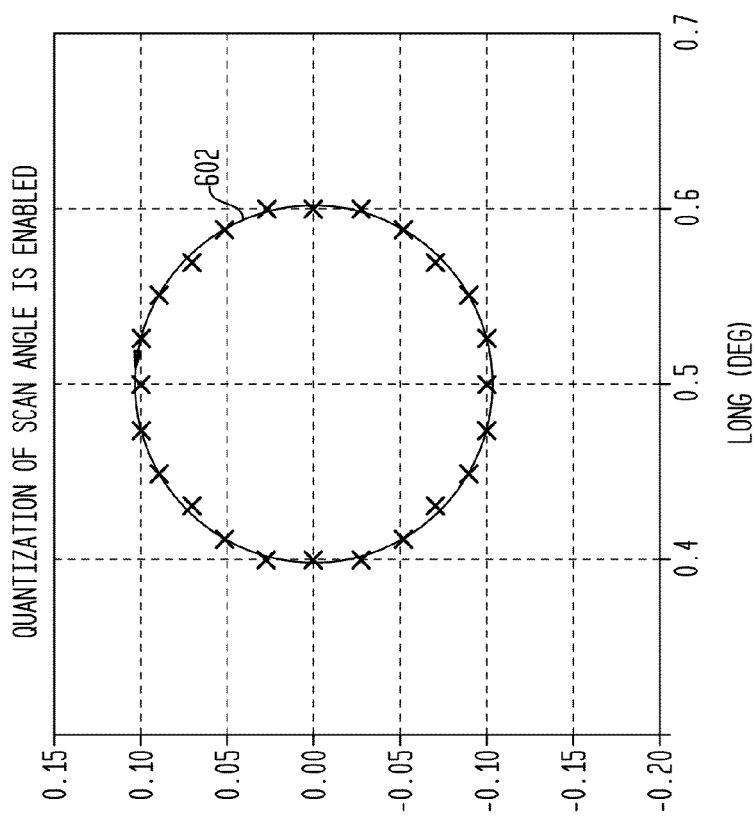
FIG. 6a is a graph of a scan path shown with a 0.1 degree radius circular scan performed at 24 discrete points on bore site with no spatial quantization error in one embodiment of the scan alignment system and method.
Figure 6B:
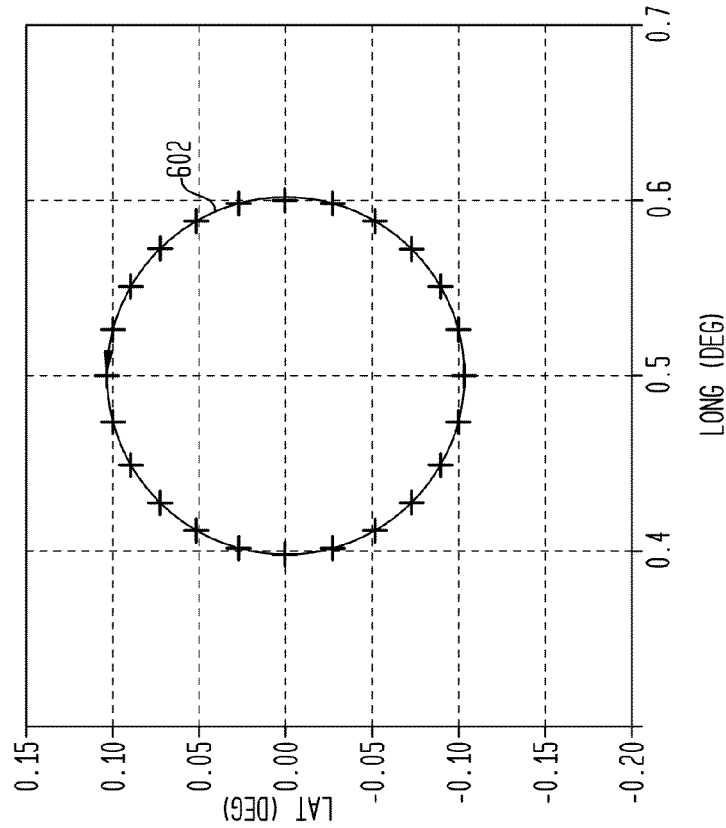
FIG. 6b is a graph of a scan path shown with a 0.1 degree radius circular scan performed at 24 discrete points on bore site with spatial quantization error in one embodiment of the scan alignment system and method.
Figure 7A:
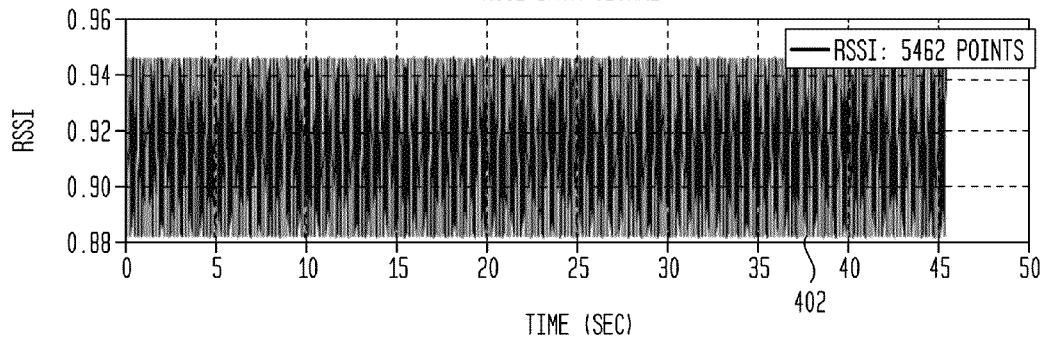
FIG. 7a is a graph of the received signal strength indication for the scan of FIG. 6b in one embodiment of the scan alignment system and method
Figure 7B:
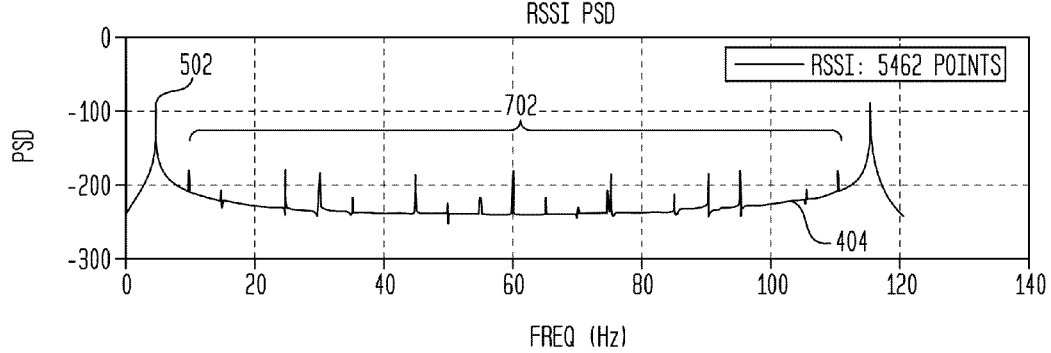
FIGS. 7b and 7c are graphs of the power spectral density for the scan of FIG. 6b in one embodiment of the scan alignment system and method.
Figure 7C:
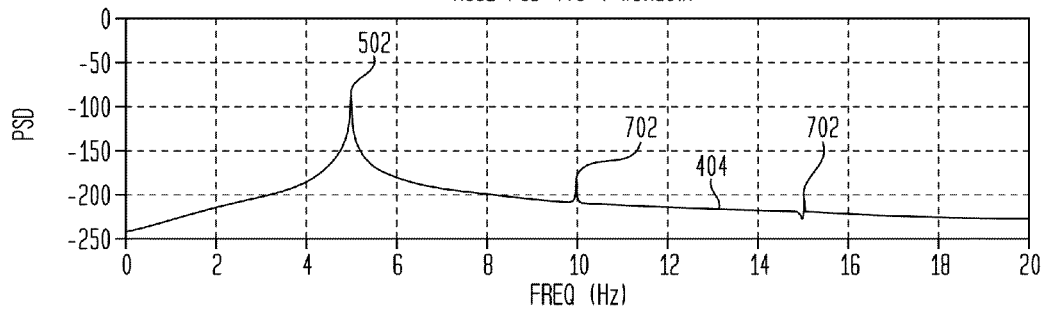

Referring now to FIGS. 6a and 6b, two scan paths 602, 604 are shown for a 0.1 degree radius scan. In FIG. 6a the scan path 602 is performed on bore site with perfect circularity and no spatial quantization of scan position samples. In FIG. 6b, the scan path 604 is performed at 24 discrete points 606 on bore site with perfect circularity having perfect spatial positioning but including spatial quantization error. Referring now to FIGS. 7a, 7b, and 7c, the signature spectrum is shown for the scan 604 of FIG. 6b with spatial quantization error (points 606.) FIG. 7b, and 7c illustrate the PSD 404 of the RSSI signal 402 of FIG. 7a. FIG. 7b, and 7c show that quantization causes generally evenly distributed energy at multiples of the scan frequency 702 above the third harmonic term of the scan frequency 502.

Figure 8:
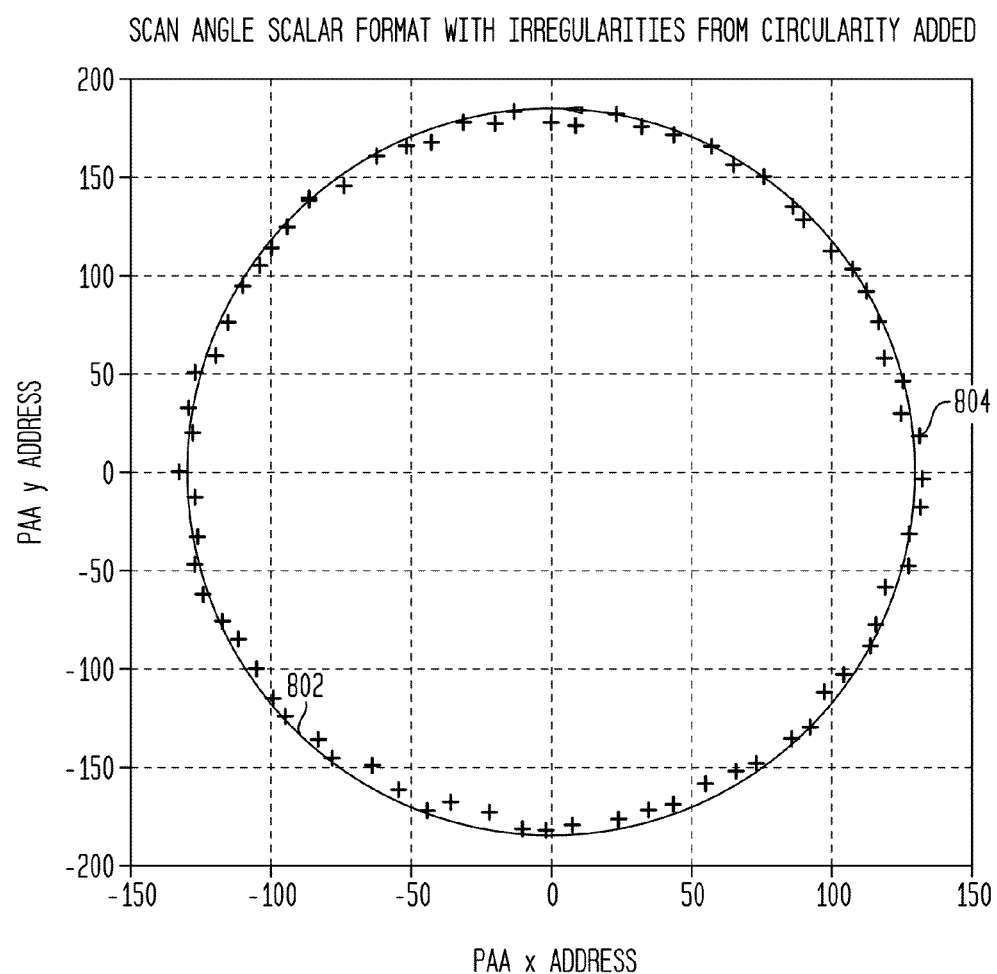
FIG. 8, is a graph of a scan path shown with a 0.1 degree radius scan performed at 72 discrete points on bore site with irregularities added to deviate from circularity in one embodiment of the scan alignment system and method.
Figure 9A:
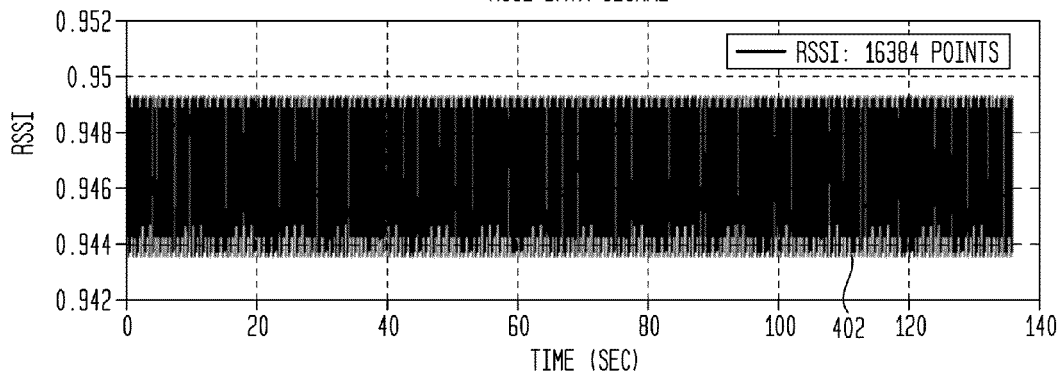
FIG. 9a is a graph of the received signal strength indication for the scan of FIG. 8 in one embodiment of the scan alignment system and method.
Figure 9B:
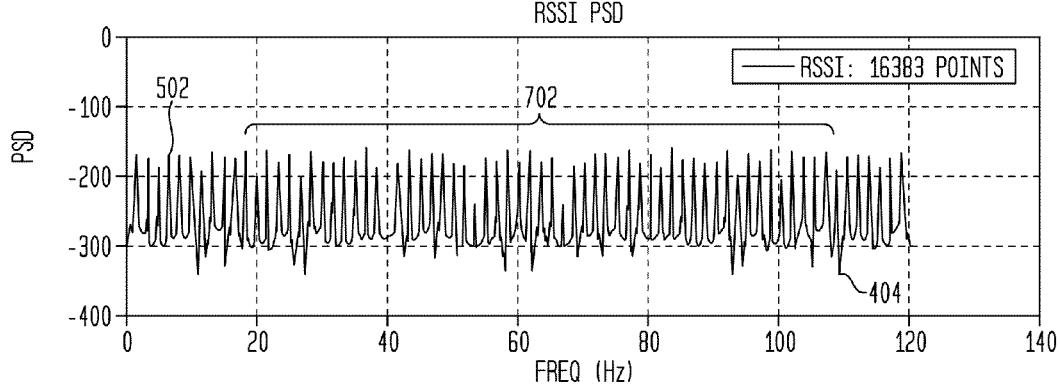
FIGS. 9b and 9c are graphs of the power spectral density for the scan of FIG. 8 in one embodiment of the scan alignment system and method.
Figure 9C:
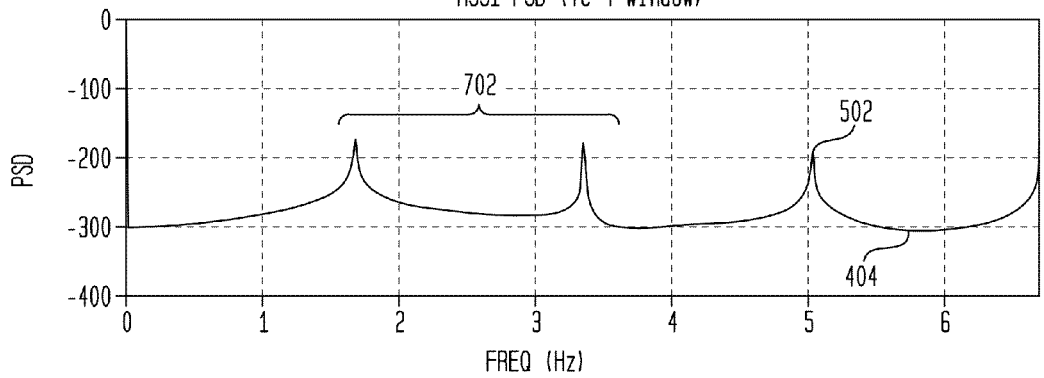

Referring now to FIG. 8, a scan path 802 is shown for a 0.1 degree radius scan performed at 72 discrete points 804 on bore site but with irregularities added to deviate from circularity but without spatial quantization. Referring now to FIGS. 9a, 9b, and 9c, the signature spectrum is shown for the scan of FIG. 8. FIG. 9a shows the received RSSI signal 402 associated with the FIG. 8 scan path 802, and FIGS. 9b and 9c are the PSD 404 of the RSSI signal 402. FIG. 9b shows the signature spectrum associated with circular irregularity which causes energy to be added at multiples of the scanning frequency. FIG. 9c is an expanded scale view of FIG. 9b.

Figure 10:
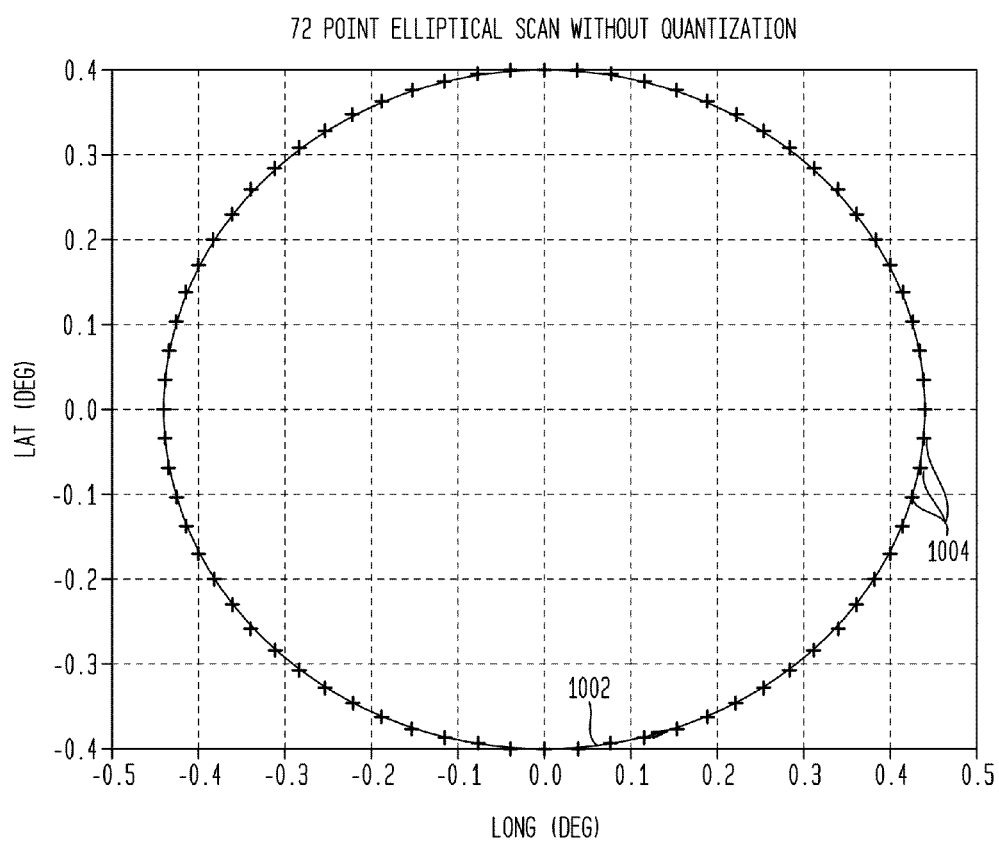
FIG. 10 is a graph of a scan path shown with a 0.1 degree radius scan performed at 72 discrete points on bore site having an elliptical irregularity added to deviate from circularity in one embodiment of the scan alignment system and method.
Figure 11A:
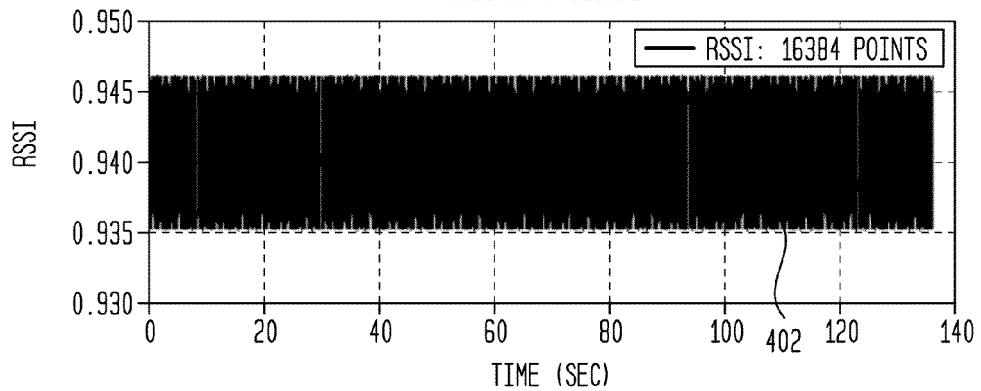
FIG. 11a is a graph of the received signal strength indication for the scan of FIG. 10 in one embodiment of the scan alignment system and method.
Figure 11B:
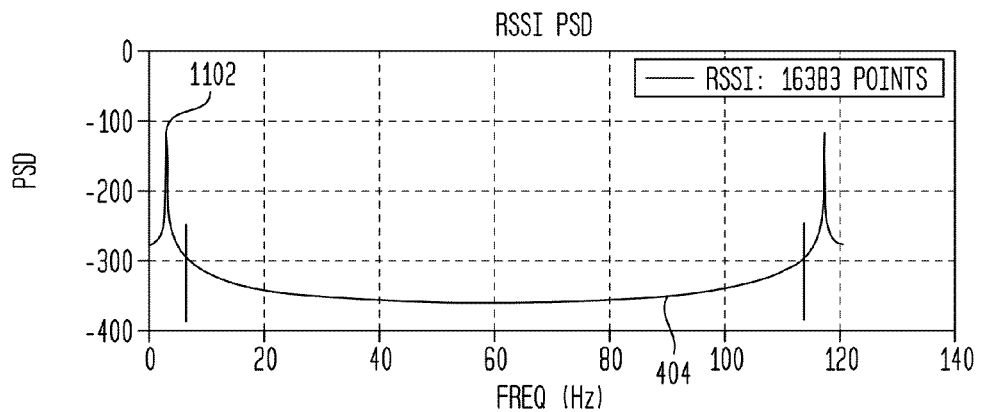
FIGS. 11b and 11c are graphs of the power spectral density for the scan of FIG. 10 in one embodiment of the scan alignment system and method.
Figure 11C:
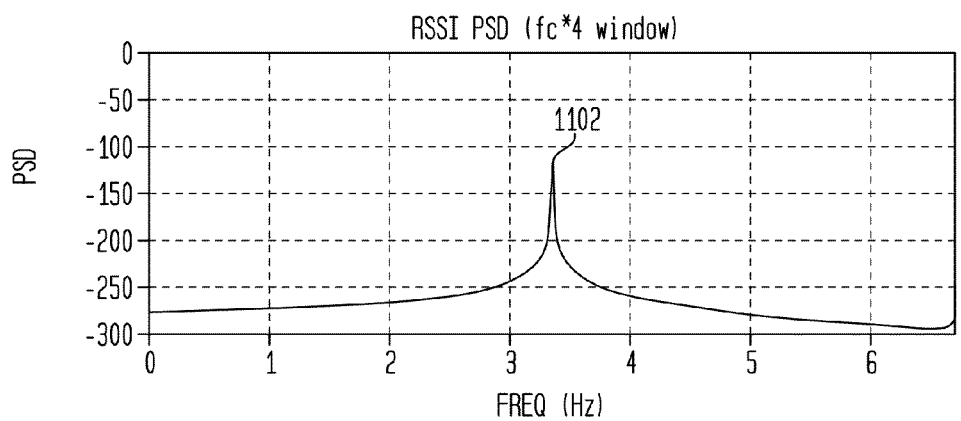

Referring now to FIG. 10, a scan path 1002 is shown for a 0.4 degree radius scan performed at 72 discrete points 1004 on bore site but having an elliptical irregularity instead of circularity. Referring now to FIGS. 11a, 11b, and 11c, the signature spectrum is shown for the scan path 1002 of FIG.

10. FIG. 11a shows the received RSSI signal 402 associated with the FIG. 10 scan path 1002. FIGS. 11b and 11c are the PSD 404 of the RSSI signal 402. FIGS. 11b and 11c illustrate that the energy is added at two times the scanning frequency 1102 instead of at the scanning frequency as is the case for a circular scanning pattern. The spectral signature distinguishes the scan condition.

Once the desired scan signature has been determined, the actual scan 110 is calibrated by altering the 2*N constants $k_{xi}$, $\Phi_{xi}$, $k_{yi}$, $\Phi_{yi}$ input to the first smooth function offset alignment generator 306, second smooth function offset alignment generator 308, and by adjusting the gain of one axis relative to the other using the gain adjustment amplifier 304. The polarization of the antenna 104 during the scan 110 is calibrated using the $k_{pi}$, $\Phi_{pi}$ constants input into the third smooth function generator 300. These calibrations are used to adjust the scan path 106 actually traversed by the antenna 104, and the polarization of the antenna 104, so that the RSSI signal 402 and PSD 404 more closely approximates the PSD 404 for the desired scan signature. The spectral signature that is produced as a result of performing a scan 110 is used as a sensitive measure of scan 110 pattern irregularity. The scan 110 is corrected by applying the smooth function waveforms to the first smooth function offset alignment generator 306, second smooth function offset alignment generator 308, and third smooth function offset alignment generator 300, to pre-distort the scan path 106 actually traversed in a manner and in an amount sufficient to effect the desired spectral signature.

The association between scan path error and spectral characteristic is learned through modeling. Modeling is used instead of measurements, because the physical movement of the antenna 104 as it is steered through a scan path 106 is generally difficult to measure with sufficient accuracy, and in the case of electronically steerable antennas may not be visible at all. If the scan path 106 were visible, a method such as described in U.S. Pat. No. 4,871,948 entitled "Memory Mapped Deflection Correction System" to Nelson could be employed. In U.S. Pat. No. 4,871,948 the "scan path" of electron beams in a CRT, or cathode ray tube, are corrected for mis-convergence. Because the mis-convergence of the "scan paths" are visible, the technician can visually recognize patterns of mis-convergence over the whole screen of a mis-converged CRT and respond by inserting correction waveforms intended to bring the whole display screen into a condition that meets requirements. Smooth functions are used to correct the mis-convergence of the "scan paths" rather than point-by-point changes to the "scan path" because unlike smooth functions, point-by-point changes are not bandlimited and cause alias-induced scanning error. These new alias-induced errors would then have to be corrected by the technician, creating a never ending correction loop. Similarly, smooth functions are used in an embodiment of the present disclosure because they are bandlimited and therefore do not introduce new alias-induced error in the scan path 106.

Calibration can also be part of a dynamic system whose alignment requires time continuous calibration. An example scenario is when an antenna 104 is integrated with a structure that is flexible and subject to loads. In this scenario, the shape and direction of the beam of the antenna 104 depends upon the environment of the vehicle. In embodiments the antenna 104 is comprised of phased array elements attached directly to the surface of an aircraft, with each array element potentially moving with respect to the other array elements. Such a condition would create a real time need to calibrate, as well as operate, the antenna 104. The scan path 106 is dynamically adjusted to maintain the signature scanning spectrum in spite of dynamic fluctuations, or path variations, in the scan path and the directional character of the "instantaneous" antenna 104. In an embodiment, corrections to the scan path 106 are based upon statistical qualities of the received signal responsive to the dynamic changes that are occurring such as the received signal's features deviation from the intended mean, standard deviation, variance, etc.

In one embodiment, the antenna is a Darpa Integrated Sensor Is Structure (ISIS) antenna that is physically large and is attached to non-rigid structure. Aligning the scan 110 actually traversed by the antenna 104 can increase received signal-to-noise and minimize tracking errors that are induced by structural deformation. Continuous alignment allows continuing signal processing gain through the filters that are part of the tracking system. In this scenario, a signal source is used to calibrate the scan 110 by minimization of the spectral spreading associated with beam shape and direction changes. To conform to spectral bandlimiting conditions, calibration is performed by altering the 2*N constants $k_{xi}$, $\Phi_{xi}$, $k_{yi}$, $\Phi_{yi}$, $k_{pi}$, $\Phi_{pi}$ input to the first smooth function offset alignment generator 306, second smooth function offset alignment generator 308, and third smooth function offset alignment generator, rather than adjusting the scan 110 and polarization based on individual element changes. Such overall control avoids under sampling induced aliasing. In addition to optimizing the scan path 106, a measure of scan path 106 residual misalignment can be produced to reflect the disturbance induced on the beam by the structural deformation.

Referring now to FIG. 12, in one embodiment of the scan alignment system 1200, the scan alignment system 1200 generates 1202 a scan path 106 using the scan path generator 302. The directional antenna 104 is scanned 1204 in the direction of a tracked satellite 108 or other source of radiation along the scan path 106 to receive 1206 the signal signature responsive to the scan 110 that was actually performed. The signal signature is compared 1208 with a reference signature modeled from the scan path 106 that was intended. In one embodiment, the compare 1208 operation is based on the distribution of the relative powers of frequencies in a power spectral density (PSD) 404 measurement of the RSSI signal 402. One or more corrective calibrations are determined 1210 to minimize the differences between the signal signature and the reference signature in future scans 110. These calibrations, nominally smooth corrective functions, are applied 1212 to the scan generator 302 to pre-correct the scan 110 for the directional antenna 104.

Figure 13:
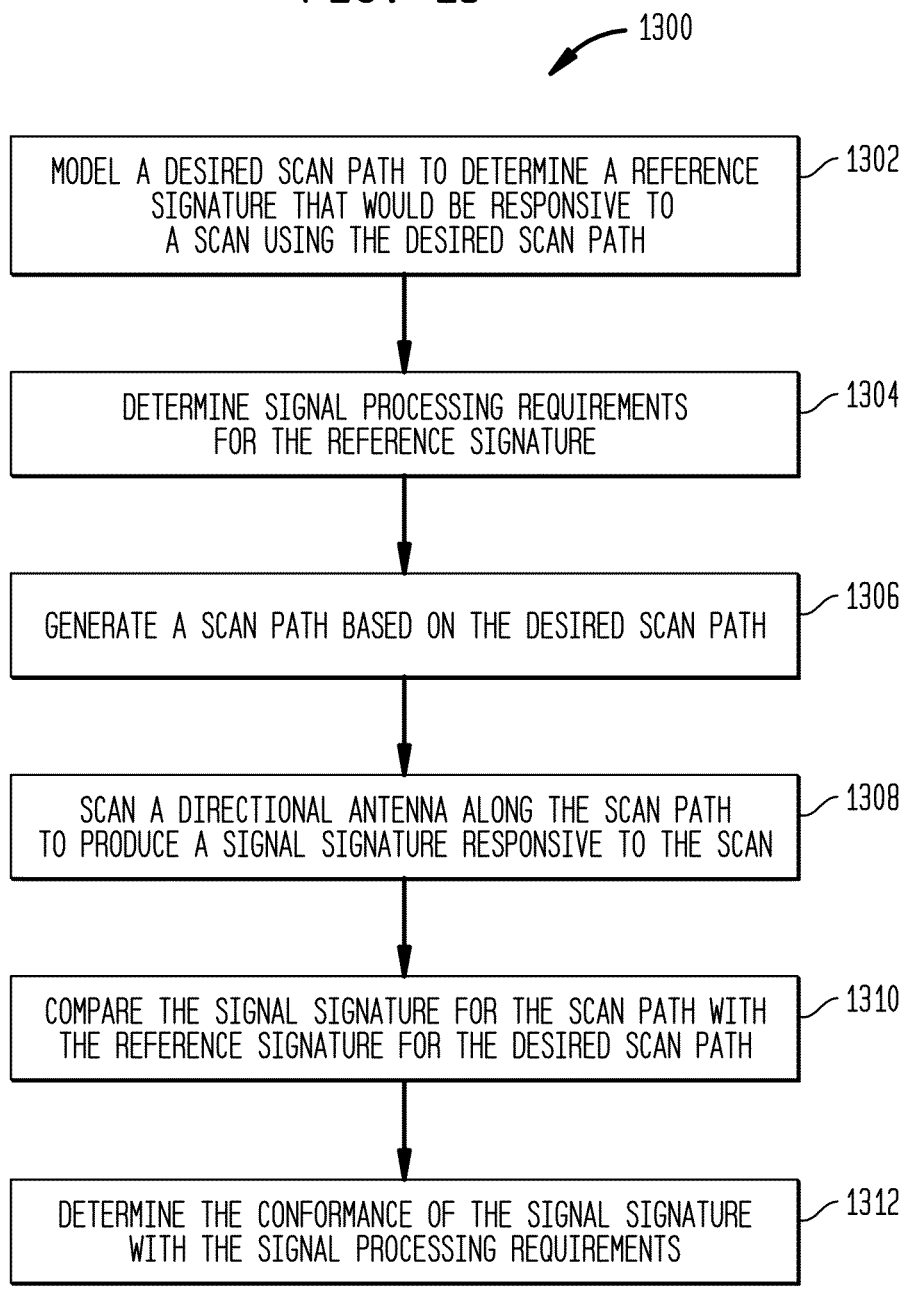
FIG. 13 is a flowchart of a scan alignment verification process in one embodiment of the scan alignment system and method.

Referring now to FIG. 13, in one embodiment of the scan verification system 1300, a desired scan path is modeled 1302 to determine a reference signature for the desired scan path. Signal processing requirements are determined 1304 for the desired scan path. A scan path 106 is generated 1306 based on the desired scan path, and the directional antenna 104 is scanned 1308 to produce a signal signature that is responsive the scan path 106. The signal signature for the scan path 106 is compared 1310 with the reference signature modeled 1302 for the desired scan path to determine 1310 whether the directional antenna 104 using the scan path 106 will produce an RSSI signal and signal signature that will conform to the requirements of the signal processing plan.

The scan verification system 1300 can be performed in conjunction with the application of corrective calibrations of the scan alignment system 1200. The corrective calibrations can be iteratively applied in order to adjust the scan path 106 until the directional antenna 104 produces an RSSI signal that satisfies the signal processing plan for the directional antenna system. After each iterative corrective calibration, the scan verification system 1300 determines 1310 whether the RSSI signal conforms to the requirements of the signal processing plan, and if not, additional corrective calibrations are applied. The scan path 106 does not have to produce a perfect RSSI signal, but instead only has to be good enough to work for the signal processing plan. In an example embodiment, a directional antenna system comprises a directional antenna 104 that traverses a scan path 106 to produce an RSSI signal responsive to the scan, where the scan path 106 has been calibrated to produce an RSSI signal that conforms to the signal processing plan for the directional antenna system.

Figure 14:
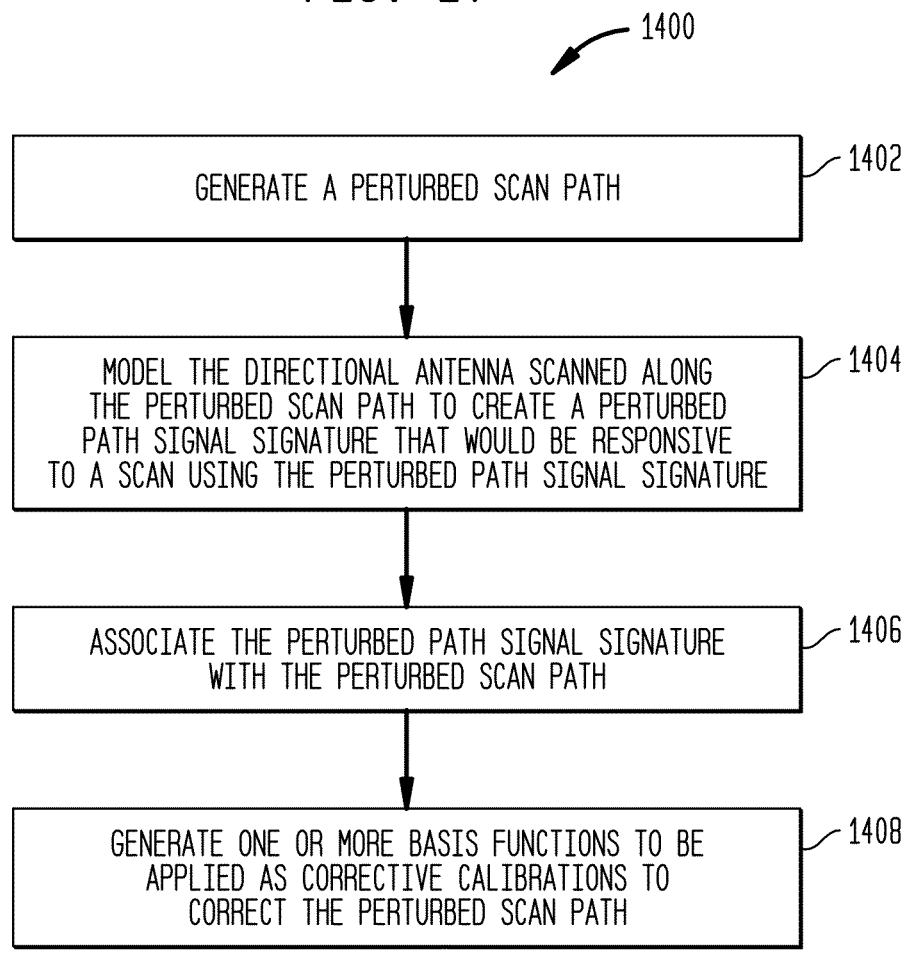
FIG. 14 is a flowchart of a method for associating basis functions used in calibration with perturbed scan path signal signatures in one embodiment of the scan alignment system and method.

Referring now to FIG. 14, in one embodiment of the scan association system 1400, a perturbed scan path for a directional antenna 104 is generated 1402 that includes a perturbance in a scan path 106. The scan association system 1400 models 1404 a scan 110 of the directional antenna 104 scanning the perturbed scan path to create a perturbed path signal signature that would be responsive the directional antenna 104 actually performing a scan 110 using the perturbed scan path. In an alternative embodiment, a scan 110 using the perturbed scan path is actual performed and measured to produce the perturbed path signal signature. The scan association system 1400 then associates the perturbed path signal signature with the perturbed scan path, which becomes a reference signature for the particular perturbance.

In embodiments, perturbances include basis perturbances such as quantizing the scan path 106, creating a polarization error of the directional antenna 104 during a scan 110, changing a frequency of a scan 110 during one or multiple traverses of the scan path 106, creating an asymmetry in the scan path 106, creating one or more point irregularities in the scan path 106, creating an ellipticity in the scan path 106, creating a tilt in the scan path 106, creating a skew in the scan path 106, inducing a vibration in the directional antenna 104 to alter the scan path 106, inducing a time-varying motion in the directional antenna 104 to alter the scan path 106, and inducing a distortion in the directional antenna 104 to alter the scan path 106. It should be noted that these are just basic perturbances, and the perturbances of a scan alignment system will comprise additional complex perturbances and associated signal signatures that can be used to determine the smooth functions to use to calibrate the scan 110 of the directional antenna 104.

Multiple perturbances can be used to create a basis for the synthesis of corrective smooth functions. Using these associations, the scan association system 1400 generates 1408 one or more basis functions that be synthesized into smooth function corrective calibrations for an uncalibrated scan path 106. In an embodiment, the basis functions used to calibrate the scan path 106 are a set of complementary basis functions that were used to perturb the scan path 106. In this manner, the effect of the perturbance is cancelled out by an equal but opposite "perturbance". In embodiments, the basis functions use bases that are orthogonal to one another; in other embodiments, non-orthogonal basis functions are used. In embodiments, the basis functions are based on orthogonal or non-orthogonal coordinate systems, including but not limited to Cartesian coordinate systems, polar coordinate systems, spherical coordinate systems, etc.

The embodiments of the invention shown in the drawings and described above are exemplary of numerous embodiments that may be made within the scope of the appended claims. It is contemplated that numerous other configurations of a scan alignment system may be created taking advantage of the disclosed approach. It is the applicant's intention that the scope of the patent issuing herefrom will be limited only by the scope of the appended claims.

What is claimed is:

1. A method of correcting a scan path for a directional antenna system, the method comprising:

generating an intended scan path by a scan path generator, wherein the intended scan path is a closed scan path around an expected directional center of a signal beam;

scanning a directional antenna along an uncalibrated actual scan path by steering the directional antenna according to the intended scan path;

receiving through the directional antenna a signal signature responsive to the scanning in said uncalibrated actual scan path;

comparing said received signal signature with a reference signature for said intended scan path, wherein said reference signature is generated by modeling said directional antenna scanning said intended scan path;

determining a corrective calibration that minimizes a difference between said received signal signature and said reference signature;

applying said corrective calibration as a corrective waveform to said scan path generator; and scanning said directional antenna along a calibrated actual scan path having reduced deviation from said intended scan path by steering the directional antenna according to a combination of said intended scan path and said corrective waveform.

2. The method of claim 1 wherein said corrective calibration comprises a corrective waveform for a scan position of said scan path and a corrective waveform for a polarization of said directional antenna.

3. The method of claim 1, further comprising:

dynamically applying a plurality of corrective calibrations as said corrective waveforms to said scan path generator during operation of the directional antenna system, and wherein said corrective calibration is in response to a dynamic change selected from the group consisting of a change in a beam directional character, a change in said scan path, and a change in polarization.

4. The method of claim 1, wherein said corrective calibration is statistically selected to minimize said difference between said received signal signature and said reference signature over a period of time.

5. The method of claim 1, wherein said corrective calibration is a smooth function.

6. The method of claim 5, wherein said corrective calibration is determined by the operations comprising:

generating a perturbed scan path;

modeling said directional antenna scanned along said perturbed scan path to create a perturbed path signal signature;

associating said perturbed path signal signature with said perturbed scan path; and generating a basis function associated with said perturbed path signal signature to correct said perturbed scan path, said basis function to be synthesized with one or more basis functions into said corrective calibration.

7. The method of claim 6, wherein said perturbing said scan path is selected from the group consisting of quantizing said scan path, creating a polarization error of said direction antenna during a scan of said scan path, changing a frequency of a scan of said scan path, creating an asymmetry in said scan path, creating an irregularity in said scan path, creating an ellipticity in said scan path, creating a tilt in said scan path, creating a skew in said scan path, inducing a vibration in said directional antenna to alter said scan path, inducing a time-varying motion in said directional antenna to alter said scan path, and inducing a distortion in said directional antenna to alter said scan path.

8. The method of claim 6, wherein said comparing operation compares a spectral property of said reference signature and a spectral property of said received signal signature to identify a perturbed path signal signature as a component in said received signal signature, and wherein said corrective calibration is synthesized at least in part from a basis function associated with said perturbed path signal signature.

9. The method of claim 8, wherein said spectral property is a power at a frequency that is an integer multiple of a scanning frequency of said scan path generated by said scan path generator.

10. The method of claim 1, wherein said directional antenna is selected from the group consisting of a directionally agile antenna, a phased array antenna, a very small aperture antenna, and an Integrated Sensor Is Structure (ISIS) antenna.

11. The method of claim 1, wherein said scan path is selected from the group consisting of a scan path in more than one dimension, a closed scan path, a scan path with dynamic polarization, a circular scan path, a conical scan path, an elliptical scan path, a wavelet scan path, a Slepian scan path, a Gabor scan path, an equal amplitude scan path, a spectrally compact scan path, a spectrally compact equal amplitude scan path, and an apodized scan path wherein said apodized scan path further comprises a window function applied to said scan path to produce a start apodization and stop apodization of said scan path, said window function is selected from the group consisting of Bartlett, Bartlett-Hanning, Blackman, Blackman-Harris, Bohman, Chebyshev, Flat Top, Gaussian, Hamming, Hann, Kaiser, Nuttall, Parzen, Rectangular, Triangular, and Tukey window functions.

12. A method of verifying the conformance of a scan path for a directional antenna system with a signal processing requirement, the method comprising:
modeling an intended scan path for a directional antenna to determine a reference signature;
determining a signal processing requirement based on said reference signature;
generating a scan path by a scan path generator based upon said intended scan path;
scanning a directional antenna along an actual scan path based upon said generated scan path;
receiving a signal signature responsive to said scanning;
comparing said signal signature for said actual scan path with said reference signature for said intended scan path;
determining the conformance of said signal signature with said signal processing requirement;
determining a corrective calibration that minimizes a difference between said signal signature and said reference signature;
applying said corrective calibration as a corrective waveform to said scan path generator; and
repeating said operations of generating, scanning, receiving, comparing, and determining conformance based upon a combination of said intended scan path and said corrective calibration, with the actual scan path having reduced deviation from said intended scan path by steering the directional antenna according to said combination.

13. The method of claim 12, wherein said corrective calibration is synthesized at least in part from one or more corrective basis functions associated with a perturbed path signal signature; wherein said perturbed path signal signature is associated with a perturbed scan path selected from the group consisting of a wavelet scan path, a Slepian scan path, a Gabor scan path, a scan path having a polarization error, a scan path having an azimuth error, a scan path having an elevation error, a scan path having a change in scan frequency, a quantized scan path, an asymmetric scan path, a scan path having an irregularity, an elliptic scan path, a tilted scan path, a skewed scan path, a scan path dynamically altered by vibration in said directional antenna, a scan path dynamically altered by time-varying motion in said directional antenna, and a scan path altered by distortion in said directional antenna; and wherein said perturbed path signal signature is obtained by modeling a scan of the directional antenna scanning the perturbed scan path or by scanning the directional antenna using the perturbed scan path.

14. A system for calibrating a directional antenna system scan, the system comprising:
a calibrated scan generator operably configured to generate an intended scan path for a directional antenna, wherein the intended scan path is a closed scan path around an expected directional center of a signal beam;
an alignment generator operably configured to provide a corrective calibration to said calibrated scan generator to align said intended scan path; and
a directional antenna operably configured to perform an actual scan in an estimated direction of a source of electromagnetic radiation using said intended scan path and to receive a signal signature responsive to the actual scan in said closed scan path;
wherein said calibrated scan generator is configured to compare said received signal signature with a reference signal signature for said intended scan path to determine a corrective calibration for said alignment generator, and wherein said reference signature is generated by modeling said directional antenna scanning said intended scan path.

15. The system of claim 14, further comprising:
means for storing a plurality of smooth functions, each of said smooth functions associated with a perturbed scan path and one or more corrective basis functions, and
wherein said calibrated scan generator identifies a component of a perturbed path signal signature in said signal signature; and
wherein said calibrated scan generator synthesizes said corrective calibration from said one or more corrective basis functions associated with said perturbed path signal signatures.

16. The system of claim 15, wherein said perturbed scan path is selected from the group consisting of a wavelet scan path, a slepian scan path, a gabor scan path, a scan path having a polarization error, a scan path having an azimuth error, a scan path having an elevation error, a scan path having a change in scan frequency, a quantized scan path, an asymmetric scan path, a scan path having an irregularity, an elliptic scan path, a tilted scan path, a skewed scan path, a scan path dynamically altered by vibration in said directional antenna, a scan path dynamically altered by time-varying motion in said directional antenna, and a scan path altered by distortion in said directional antenna.

17. The system of claim 14, wherein said directional antenna is selected from the group consisting of a directionally agile antenna, a phased array antenna, a very small aperture antenna, and an Integrated Sensor Is Structure (ISIS) antenna.

18. The system of claim 14, wherein said scan path is selected from the group consisting of a scan path in more than one dimension, a closed scan path, a polarization scan path, an azimuth scan path, an elevation scan path, a circular scan path, a conical scan path, an elliptical scan path, a Slepian scan path, a Gabor scan path, an equal amplitude scan path, a spectrally compact scan path, a spectrally compact equal amplitude scan path, and an apodized scan path, wherein said apodized scan path further comprises a window function applied to said scan path to produce a start apodization and stop apodization of said scan path, said window function is selected from the group consisting of Bartlett, Bartlett-Hanning, Blackman, Blackman-Harris, Bohman, Chebyshev, Flat Top, Gaussian, Hamming, Hann, Kaiser, Nuttall, Parzen, Rectangular, Triangular, and Tukey window functions.

* * * * *